(12) United States Patent
Choudhury

(10) Patent No.: US 8,289,894 B2
(45) Date of Patent: Oct. 16, 2012

(54) SYSTEMS AND METHODS FOR INTER RELAY INTERFERENCE COORDINATION

(75) Inventor: Sayantan Choudhury, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 858 days.

(21) Appl. No.: 12/210,954

(22) Filed: Sep. 15, 2008

(65) Prior Publication Data
US 2010/0067427 A1  Mar. 18, 2010

(51) Int. Cl.
H04B 7/14 (2006.01)
(52) U.S. Cl. .............................. 370/315; 370/328; 455/7
(58) Field of Classification Search .................. 370/310, 370/315, 328, 329, 330; 455/7, 9, 10, 17, 455/23
See application file for complete search history.

(56) References Cited

U.S. PATENT DOCUMENTS

| | | | |
|---|---|---|---|
| 6,243,371 B1 | 6/2001 | Chawla et al. | |
| 7,336,930 B2 | 2/2008 | Larsson et al. | |
| 7,406,060 B2 | 7/2008 | Periyalwar et al. | |
| 7,565,149 B2* | 7/2009 | Saffre et al. | 455/450 |
| 2006/0083205 A1* | 4/2006 | Buddhikot et al. | 370/338 |
| 2008/0075094 A1* | 3/2008 | Ahn et al. | 370/400 |
| 2008/0171551 A1 | 7/2008 | Zhu et al. | |
| 2009/0201846 A1* | 8/2009 | Horn et al. | 370/315 |

FOREIGN PATENT DOCUMENTS

| | | |
|---|---|---|
| EP | 1 892 972 | 2/2008 |
| EP | 1 944 911 | 7/2008 |
| JP | 2008-172762 | 7/2008 |
| WO | 2007/136220 | 11/2007 |
| WO | 2008/035166 | 3/2008 |

OTHER PUBLICATIONS

Panasonic, "Discussion on the Various Types of Relays," R1-082397, Jul. 2008.
International Search Report issued for International Patent Application No. PCT/JP2009/065979 on Dec. 22, 2009.
R. Pabst et al. "Relay-Based Deployment Concepts for Wireless and Mobile Broadband Radio," IEEE Communications Magazine, vol. 2, No. 9, Sep. 2004, pp. 80-89.
L. Xie, X. Zhang, "TDMA and FDMA Based Resource Allocations for Quality of Service Provisioning Over Wireless Relay Network," IEEE Wireless Communications and Networking Conference, Mar. 2007, pp. 3153-3157.
Ericsson, "Uplink Inter-Cell Interference Coordination," R1-080360, Jan. 2008.

* cited by examiner

Primary Examiner — Chi Pham
Assistant Examiner — Weibin Huang
(74) Attorney, Agent, or Firm — Austin Rapp & Hardman

(57) ABSTRACT

A method for inter relay interference coordination (IRIC) by a first relay node in a wireless communications system is described. A second relay node is communicated with over a relay interface. A first set of user equipment (UE) communication settings is received over the relay interface that correspond to the second relay node. A second set of UE communication settings is determined that correspond to the first relay node. The second set of UE communication settings are based on the first set of UE communication settings.

23 Claims, 14 Drawing Sheets

US 8,289,894 B2

SYSTEMS AND METHODS FOR INTER RELAY INTERFERENCE COORDINATION

TECHNICAL FIELD

The present disclosure relates generally to communications and wireless communications systems. More specifically, the present disclosure relates to systems and methods for inter relay interference coordination.

BACKGROUND

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN). In 3GPP LTE a mobile terminal or device is called a "user equipment" (UE) and a relaying station is called a "relay node." A base station may be referred to as an evolved NodeB (eNodeB).

One of the current goals of the 3GPP LTE and WiMAX standardization work is to improve the cell edge throughput and coverage for edge users. Among the different proposals being considered, one of the proposals is to use relay nodes to relay the information from the base station to the mobile terminal and vice-versa. The use of relay nodes has been adopted for use in the Institute of Electrical and Electronics Engineers (IEEE) 802.16m and the Worldwide Interoperability for Microwave Access (WiMax) technologies.

Resource scheduling means the eNodeB allocates the modulation schemes, coding rates, time slot and subcarrier frequencies to optimize the downlink and uplink transmissions for each UE. Because of varying quality of service (QoS) and security requirements, the retransmission of signals may be prevented because these signals may cause interference, consume unnecessary power, and lower the capacity of the network.

Wireless channels suffer from path loss, shadowing, and multipath effects that can degrade signal quality. The use of relay nodes may improve the cell-edge performance of a UE because the distance from the relay to the UE is much less than the distance from the relay to the eNodeB.

Therefore, improvements in wireless networks can be obtained by improving cell-edge performance and reducing/removing inter-relay interference without causing degradation in the system performance.

DETAILED DESCRIPTION

Figure 1:
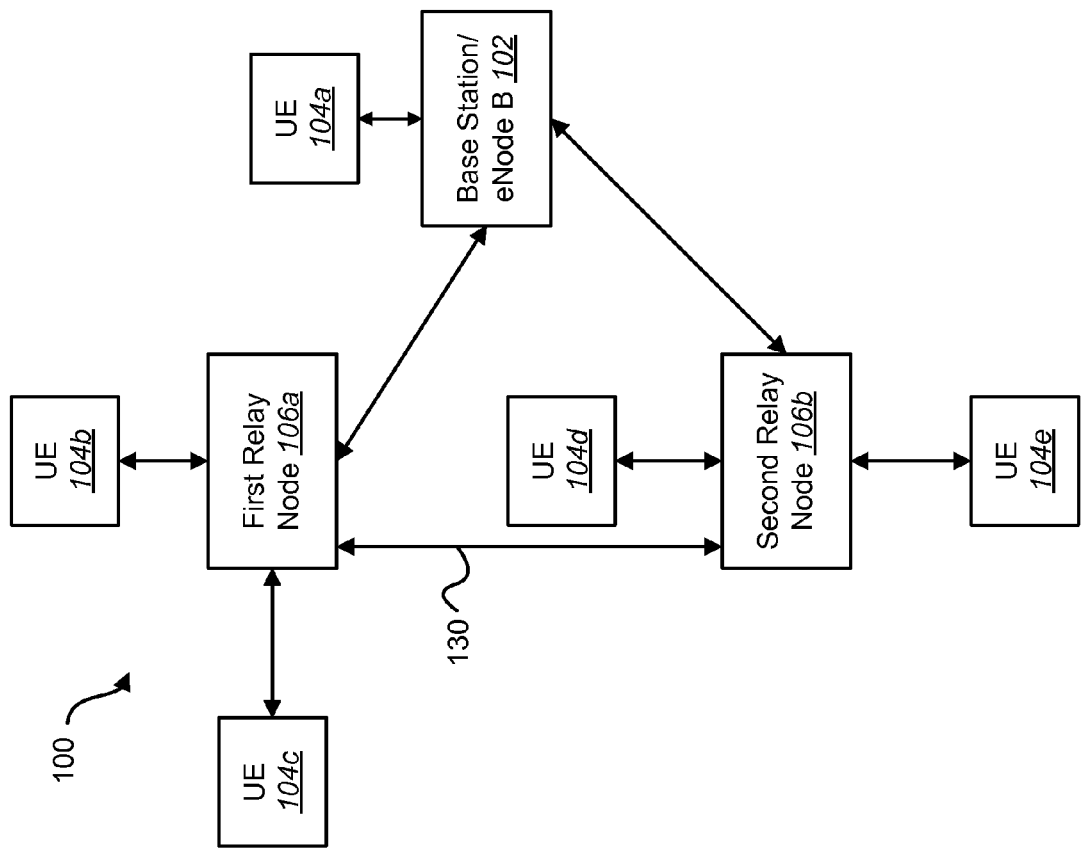
FIG. 1 illustrates a wireless communication system 100 in which the present systems and methods may be practiced.

A method for inter relay interference coordination (IRIC) by a first relay node in a wireless communications system is disclosed. A second relay node is communicated with over a relay interface. A first set of user equipment (UE) communication settings is received over the relay interface that corresponds to the second relay node. A second set of UE communication settings is determined that corresponds to the first relay node. The second set of UE communication settings is based on the first set of UE communication settings.

The second set of UE communication settings may be sent to the second relay node over the relay interface. The second set of UE communication settings may be sent to a third relay node over the relay interface. A UE may be communicated with using the first set of UE communication settings. The first set of UE communication settings may include using a first communication frequency and the second set of UE communication settings may include using a second communication frequency. The second communication frequency may be selected to reduce or prevent interference between the first relay node and the second relay node. The second communication frequency may be selected to be mutually orthogonal with the first communication frequency to reduce or prevent interference between the first relay node and the second relay node. The first set of UE communication settings may include a first transmission schedule and the second set of UE communication settings may include a second transmission schedule. The first transmission schedule and the second transmission schedule may include scheduled transmission time slots. The first transmission schedule may include scheduled uplink transmission time slots that are not concurrent with scheduled uplink transmission time slots of the second transmission schedule. The first set of UE communication settings may include a first spatial beamforming schedule and the second set of UE communication settings may include a second spatial beamforming schedule. The second spatial beamforming schedule may be set to reduce or prevent interference with the second relay node.

A relay node for selective transmission in a wireless communications system is disclosed. The relay node includes a processor and memory in electronic communication with the processor. Executable instructions are stored in the memory. A second relay node is communicated with over a relay interface. A first set of user equipment (UE) communication settings is received over the relay interface that corresponds to the second relay node. A second set of UE communication settings is determined that corresponds to the first relay node. The second set of UE communication settings is based on the first set of UE communication settings.

A computer-readable medium comprising executable instructions is disclosed. A second relay node is communicated with over a relay interface. A first set of user equipment (UE) communication settings is received over the relay interface that corresponds to the second relay node. A second set of UE communication settings is determined that corresponds to the first relay node. The second set of UE communication settings is based on the first set of UE communication settings.

A wireless communication system for inter relay interference coordination (IRIC) is disclosed. The wireless communication system may include one or more base stations for serving a plurality of user equipments (UEs). The wireless communication system may include a first relay node and a second relay node in electronic communication over a relay interface. The first relay node and the second relay node may coordinate communications to reduce inter relay interference.

The first relay node and the second relay node may communicate concurrently on the uplink and downlink during the same time slot in order to reduce inter relay interference. The first relay node and the second relay node may exchange traffic information to avoid interfering with each other. The first relay node and the second relay node may use orthogonal sequences to communicate with UEs to avoid interfering with each other. The base stations may use a portion of the bandwidth for communicating with UEs and the relay nodes may use the rest of the total available bandwidth for communicating with UEs. Adjacent base stations may reserve different portions of the bandwidth for use by the relay nodes. A relay node may use a fraction of the bandwidth allocated to the relay node. The fraction of the bandwidth may depend on the traffic requirements of a UE in communication with the relay node.

The present systems and methods may be implemented and used for uplink communications and/or for downlink communications. The various configurations herein are only meant to illustrate possible examples of how the present systems and methods may be implemented and are not meant to limit the disclosure to being used with only the uplink or only the downlink. The systems and methods herein may be used with downlink communications, with uplink communications, and with both downlink and uplink communications.

Generally, there is a source, a relay node and a destination. In the uplink, the source is a UE and the destination is a base station. In the downlink the source is a base station and a UE is the destination. The role of the relay node is to assist the transmission from source to destination. The relay node helps the transmission of information from source to destination by retransmitting the source's signal to the destination.

Wireless signals may suffer from a path loss inversely proportional to the distance traveled. The use of relay nodes may increase the signal strength received by a UE (i.e. when the relay node retransmits the signal) and thus achieve higher data rates and a higher throughput. However, the use of relay nodes may also increase the inter relay interference.

FIG. 1 illustrates a wireless communication system 100 in which the present systems and methods may be practiced. In a communications system 100, transmission signals may be sent from a mobile device 104 to a base station 102 and from a base station 102 to a mobile device 104. Communications from the mobile device 104 to the base station 102 may be referred to as uplink communications. Similarly, communications from the base station 102 to the mobile device 104 may be referred to as downlink communications. A wireless communication system 100 may also include one or more relay nodes 106. Although not shown, a wireless communication system 100 may also include more than one base station 102. Additionally, a wireless communication system 100 may include more than one mobile device 104.

The present systems and methods may operate independent of the physical layer access technology used by the wireless network. Examples of access technologies include orthogonal frequency division multiplexing (OFDM), frequency division multiple access (FDMA), time division multiple access (TDMA), and code division multiple access (CDMA). In addition, the present systems and methods may operate independent of whether the system is full or half duplex.

The present systems and methods described herein relate to 3GPP LTE systems. However, the present systems and methods may be utilized for other communication systems such as IEEE 802.16(e, m), WiMax systems, and other systems where inter relay interference coordination is applicable.

A mobile station may be referred to as user equipment (UE) 104. A base station may be an evolved Node B (eNodeB). A base station/eNodeB 102 may be in wireless communication with one or more UEs 104 (which may also be referred to as mobile stations, user devices, communications devices, subscriber units, access terminals, terminals, etc.). The base station/eNodeB 102 may be a unit adapted to transmit to and receive data from cells.

In one example, the base station 102 handles the actual communication across a radio interface, covering a specific geographical area in the vicinity of the base station 102, which is referred to as a cell. Depending on sectoring, one or more cells may be served by the base station 102, and accordingly the base station 102 may support one or more UEs 104 depending on where the UEs 104 are located. In one configuration, the base station 102 provides a 3GPP (Release 8) Long Term Evolution (LTE) air interface and performs radio resource management for the communication system 100.

The base station 102 may be in electronic communication with one or more UEs 104. A first UE 104a, a second UE 104b, a third UE 104c, a fourth UE 104d and a fifth UE 104e are shown in FIG. 1. The base station 102 may transmit data to the UEs 104 and receive data from the UEs 104 over a radio frequency (RF) communication channel.

A first relay node 106a and a second relay node 106b are also shown in FIG. 1. A relay node 106 may receive transmissions from one or more UEs 104, a base station 102, or both over an RF communication channel. Alternatively, the communication link between a relay node 106 and a base station 102 may be a wired connection. The relay node 106 may retransmit or repeat some or all of the received transmissions. The relay node 106 may transmit data to the UEs 104 and receive data from the UEs 104 over an RF communication channel. The relay node 106 may also transmit data to the base station 102 and receive data from the base station 102 over an RF communication channel. In uplink and downlink communications, the relay node 106 may receive signals that are directed from UEs 104 to the base station 102 and signals that are directed from the base station 102 to UEs 104. The relay node 106 may retransmit the received signals towards the desired destination. A relay node 106 may have different modes of operation. For example, a relay node 106 may repeat every received analog signal. Alternatively, a relay node 106 may perform signal processing on the received signals before retransmission.

The signals transmitted by a UE 104 may include requests for data. The signals transmitted by the base station 102 may be data requested by a particular UE 104 such as downloaded internet data. Alternatively, the signals transmitted by the base station 102 and UEs 104 may include data for maintaining the wireless communication system 100.

The data transmissions from the base station 102 to the UEs 104 and from the UEs 104 to the base station 102 may not always be successfully received by the intended recipients. A data transmission may be successfully received by a relay node 106 that has not been successfully received by the intended recipient. The relay node 106 may thus retransmit some received data transmissions.

A UE 104 may be geographically located closer to either the base station 102 or a relay node 106. For example, a first UE 104a in FIG. 1 may be geographically closer to the base station 102 than to the first relay node 106a. In contrast, a second UE 104b may be located much closer to the first relay node 106a than to the base station 102. Similarly, in a fading environment, the first UE 104a channel to the base station 102 may be better than the channel between the first UE 104a and the first relay node 106a, meaning that the received power at the base station 102 is higher than the received power at the first relay node 106a.

The relay node 106 may also receive a reference signal from the UE 104. The reference signal received by the relay node 106 may be the same reference signal that the UE 104 sent to the base station 102. Alternatively, the UE 104 may send a different reference signal to the relay node 106. The relay node 106 may use the received reference signal to obtain measurements of the UE-relay node channel quality.

When a UE 104 is much nearer to a relay node 106 than to the base station 102, the throughput and spectral efficiency for the relay node-UE channel may be much higher than that of the base station-UE channel. However, the distance from adjacent relay nodes 106 to adjacent UEs 104 may create significant interference caused by both of the relay nodes 106.

A relay node 106 may communicate with other relay nodes 106 over a relay interface 130. The relay interface 130 may be used to exchange information among the relay nodes 106 to coordinate and avoid interference between relay nodes 106. The relay interface 130 may use a dedicated frequency for communication between relay nodes 106. Alternatively, the relay interface 130 may be a wired connection between relay nodes 106. The relay interface 130 may allow the relay nodes 106 to self organize and select a method or methods of inter relay interference coordination (IRIC).

Figure 2:
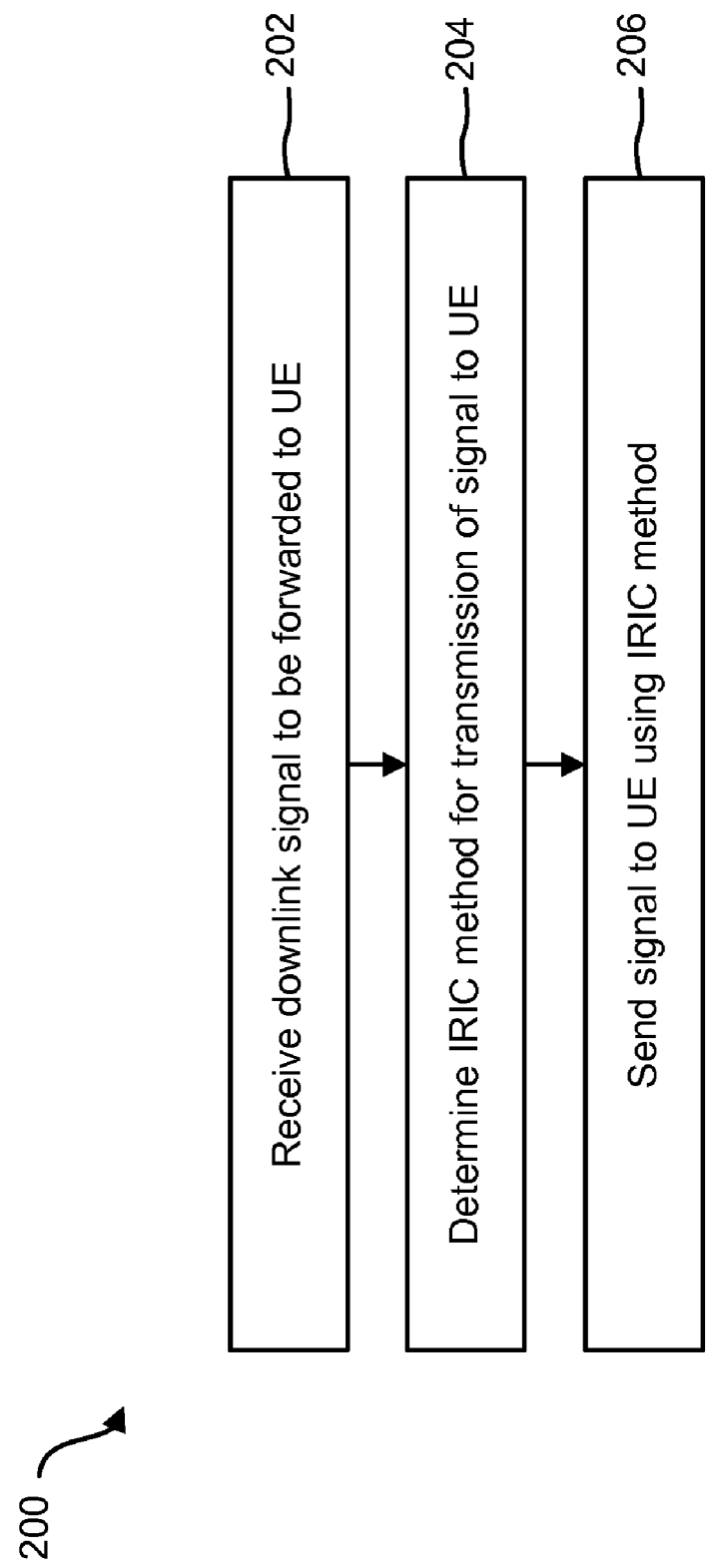
FIG. 2 is a flow diagram illustrating a method for inter relay interference coordination (IRIC)

FIG. 2 is a flow diagram illustrating a method 200 for inter relay interference coordination (IRIC). A relay node 106 may receive 202 a downlink signal that is to be forwarded to a UE 104. The relay node 106 may then determine 204 the IRIC method for the downlink transmission of the signal to the UE 104. The relay node 106 may then send 206 the signal to the UE 104 using the IRIC method. Examples of IRIC methods include frequency based resource allocation (discussed below in relation to FIGS. 4, 5, and 6), time based resource allocation (discussed below in relation to FIGS. 7, 8, and 9), space based resource allocation (discussed below in relation to FIGS. 10 and 11), randomized access schemes (discussed below in relation to FIGS. 12 and 13), power control of relay nodes 106, orthogonal sequence of relay nodes 106, and traffic based bandwidth resource allocation. A relay node 106 may also make use of a combination of the IRIC methods. For example, a relay node 106 may use an IRIC method that combines power control and frequency allocation.

In the IRIC method for power control of the relay nodes 106, individual relay nodes 106 may adjust the transmit power of the relay node 106 and/or the nearby UEs 104 based on the average (or other statistical parameters) distance of relay node-to-UE and relay node-to-base station. The relay node 106 location along with the transmit power level of the relay nodes 106 may be exchanged over the relay interface 130 to inform other relay nodes 106 of the power adjustments.

In the IRIC method using an orthogonal sequence of relay nodes 106, the chosen orthogonal sequence of each relay node 106 may be exchanged over the relay interface 130 such that relay nodes 106 in the interference range of each other choose different orthogonal sequences for transmission.

In the IRIC method for traffic based bandwidth allocation, individual relay nodes 106 may exchange the UE 104 traffic distribution with other relay nodes 106 over the relay interface 130. The other relay nodes 106 may then estimate the usage and interference patterns of neighboring relay nodes 106 and make adjustments accordingly.

Figure 3:
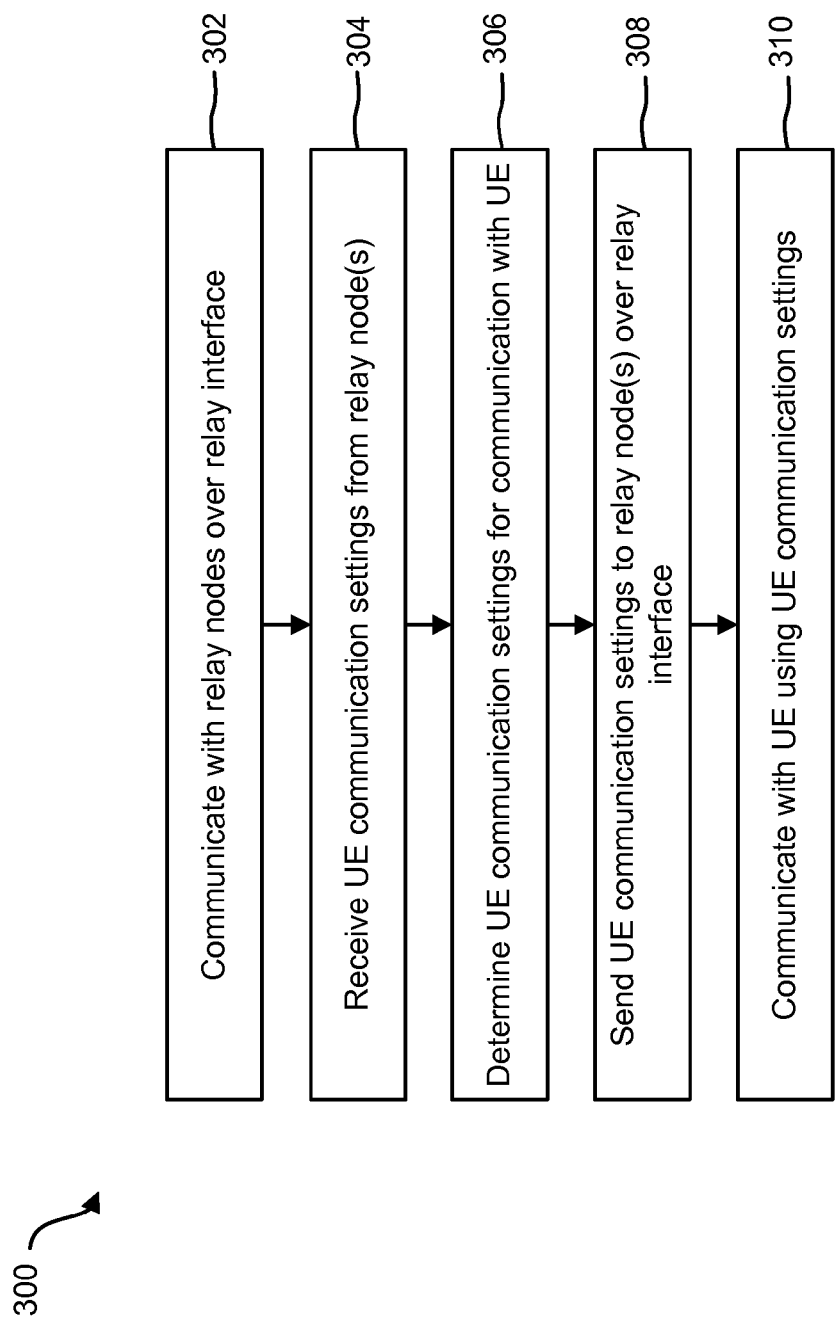
FIG. 3 is a flow diagram illustrating a more detailed method of IRIC.

FIG. 3 is a flow diagram illustrating a more detailed method 300 of IRIC. A relay node 106 may communicate 302 with nearby relay nodes 106 over a relay interface 130. The other relay nodes 106 may be situated in the same cell or nearby cells. The relay nodes 106 may all communicate with each other using a relay interface 130. The relay node 106 may receive 304 UE communication settings from the nearby relay nodes 106 over the relay interface 130. UE communication settings are discussed in further detail below in relation to FIG. 12.

The UE communication settings may include the communication settings of the nearby relay nodes such as the time slots used, the frequencies used, the use and timing of directional antennas, the power transmitted, the orthogonal sequences used, the randomized access scheme frequencies used, and the traffic distribution. The relay node 106 may use the received UE communication settings to determine 306 the UE communication settings that the relay node 106 will use in communicating with one or more UEs 104. The relay node 106 may determine the UE communication settings that will reduce or eliminate inter relay interference. The relay node 106 may then send 308 the determined UE communication settings to one or more relay nodes 106 over the relay interface 130. The relay node 106 may then communicate 310 with one or more UEs 104 using the UE communication settings that implement IRIC.

Figure 4:
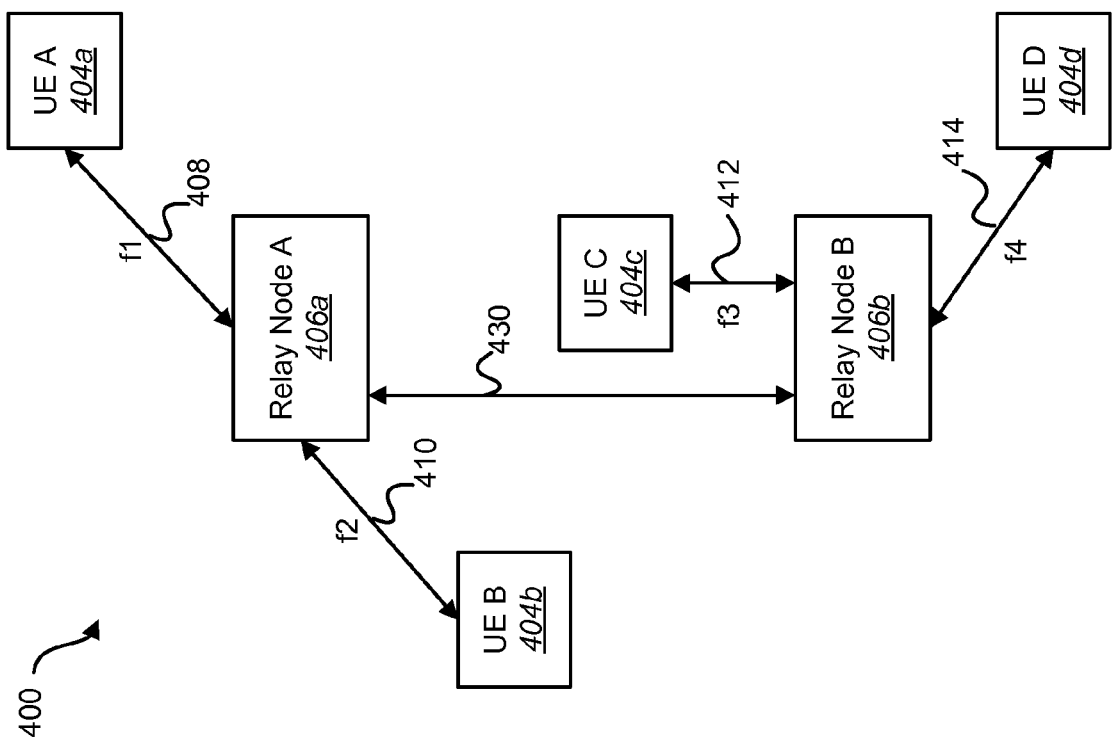
FIG. 4 is a block diagram illustrating a wireless communication system implementing frequency based resource allocation for IRIC.

FIG. 4 is a block diagram illustrating a wireless communication system 400 implementing frequency based resource allocation for IRIC. The system 400 may include multiple relay nodes 406a, 406b. The relay nodes 406 may communicate with each other over a relay interface 430. The relay nodes 406 may also each communicate with one or more UEs 404. The relay nodes 406 may be located close enough to each other that interference may occur when the relay nodes 406 communicate with the UEs 404.

As discussed above, a relay node 406 may communicate with multiple UEs 404. The relay node 406 may use a different frequency for each UE 404 that the relay node 406 is in electronic communication with. For example, relay node A 406a may communicate with UE A 404a using a first frequency f1 408. Relay node A 406a may also communicate with UE B 404b using a second frequency f2 410. The frequencies f1 408 and f2 410 may be different frequencies. Alternatively, f1 408 and f2 410 may be the same frequency. The frequencies f1 408 and f2 410 may be part of the UE communication settings. Each relay node 406 may transmit using different frequencies to avoid interference. This is the traditional concept of using frequency division multiple access (FDMA), except that instead of using a fixed preallocation of frequencies that is fixed by the eNodeB 102 or the operator, the relay nodes 406 may dynamically adjust communication frequencies according to the communication frequencies of other relay nodes 406.

Relay node A 406a may send the UE communication settings to other relay nodes 406 over the relay interface 430. The relay nodes 406 may receive the UE communication settings and may use the received UE communication settings to determine the UE communication settings for the receiving relay node 406. For example, relay node B 406b may receive the UE communication settings of relay node A 406a over the relay interface 430. Relay node B 406b may use the UE communication settings of relay node A 406a to determine the UE communication settings of relay node B 406b.

For example, relay node B 406b may determine the frequency f3 412 that is used for wireless electronic communication with UE C 404c and the frequency f4 414 that is used for wireless electronic communication with UE D 404d based on the received UE communication settings of relay node A 406a. Relay node B 406b may use a frequency f3 412 that is different from the frequency f2 410 to avoid interference with the communications between relay node A 406a and UE B 404b. Relay node B 406b may also use a frequency f4 414 that is different from the frequency f2 410 to avoid interference with the communications between relay node A 406a and UE B 404b. Alternatively, relay node B 406b may use a frequency f4 414 that is the same as f2 410 if it is determined that communications with UE D 404d using f4 414 will not cause interference with the communications between relay node A 406a and UE B 404b. The frequencies f1 408, f2 410, f3 412, and f4 414 may all be different if interference with each other is likely.

A relay node 406 may also detect the downlink transmissions of other relay nodes 406. The relay node 406 may then choose unused frequencies for downlink transmissions that do not interfere with the downlink transmissions of other relay nodes 406.

Figure 5:
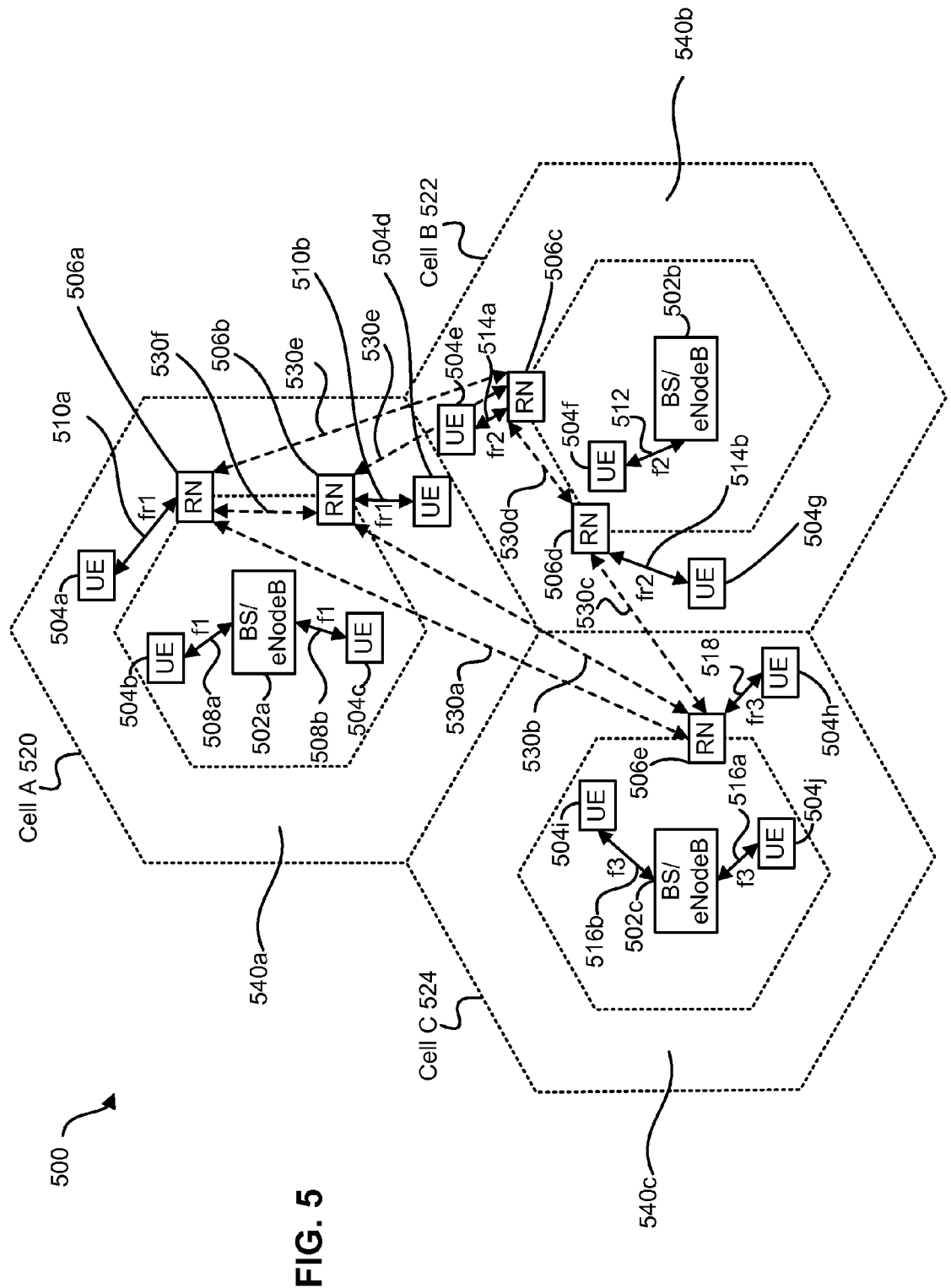
FIG. 5 is a block diagram illustrating a wireless communication system implementing a frequency based resource allocation that uses randomized access schemes for IRIC.

FIG. 5 is a block diagram illustrating a wireless communication system 500 implementing a frequency based resource allocation that uses randomized access schemes for IRIC. The system 500 includes three wireless communication regions or cells, Cell A 520, Cell B 522, and Cell C 524. Each of the cells is serviced by a base station/eNodeB, BS A 502a, BS B 502b, and BS C 502c. A cell may also include one or more relay nodes (RN) 506. A cell may be further divided into two regions: an inner region and an outer region. The outer region may be referred to as the cell-edge 540.

Each cell may share the same amount of total bandwidth. A portion of the bandwidth may be allocated to BS-UE communications and a portion of the bandwidth may be allocated to RN-UE communications. The RN-UE communications may typically occur when a UE 504 is in the cell-edge 540 region. Adjacent base stations 502 may reserve different portions of the bandwidth for use by the relay nodes 506. The portions allocated to BS-UE communications and RN-UE communications may be different for uplink and downlink communications. Alternatively, the portions allocated to BS-UE communications and RN-UE communications may be the same for uplink and downlink communications. A UE 504 may communicate with an RN 506 when the UE 504 is a sufficient distance away from the BS 502 or the channel characteristics between the UE 504 and the BS 502 are such that communications with the RN 506 are advantageous.

An RN 506 may use a randomized access scheme to communicate with a UE 504. For example, an RN 506 may randomly choose a time and/or frequency for a transmission to a UE 504. The RN 506 may choose the random frequency from within the bandwidth of frequencies allocated to RN-UE communications in the cell. Each cell may have different bandwidths allocated to BS-UE communications and RN-UE communications. For example, Cell A 520 may allocate the bandwidth f1 508 for BS-UE communications and the bandwidth fr1 510 for RN-UE communications. Likewise, Cell B 522 may allocate the bandwidth f2 512 for BS-UE communications and fr2 514 for RN-UE communications and Cell C 524 may allocate the bandwidth f3 516 for BS-UE communications and fr3 518 for RN-UE communications. Although each cell may choose how to allocate the bandwidth, f1+fr1=f2+fr2=f3+fr3=total bandwidth of the system 500. The frequency allocations may be coordinated between the relay nodes 506 over a relay interface 530.

Interference may occur when two or more UEs 504 are operating near each other. For example, UE 504d is communicating with RN 506b using the frequency fr1 510b near UE 504e which is communicating with RN 506c using the frequency fr2 514a. UE 504d and UE 504e are operating near each other and thus may be susceptible to interference. However, if fr1 510b and fr2 514a are mutually orthogonal, then the relay nodes RN 506b and RN 506c will not cause interference with each other. Likewise, fr2 514b and fr3 518 may be chosen to reduce inter cell inter relay interference for communications between RN 506d and UE 504g using fr2 514b and communications between RN 506e and 504h using fr3 518.

If a five (5) percentile is used to categorize the UEs 504 operating in the cell-edge 540, then 5% of the total bandwidth would be allocated to the RNs 506. The 5% may be chosen from a set of 20 bandwidths (100%/5%=20). This means that the wireless communication system 500 may have a reuse factor of 20 for the RNs 506 in each cell. This may significantly reduce the inter relay interference.

Figure 6:
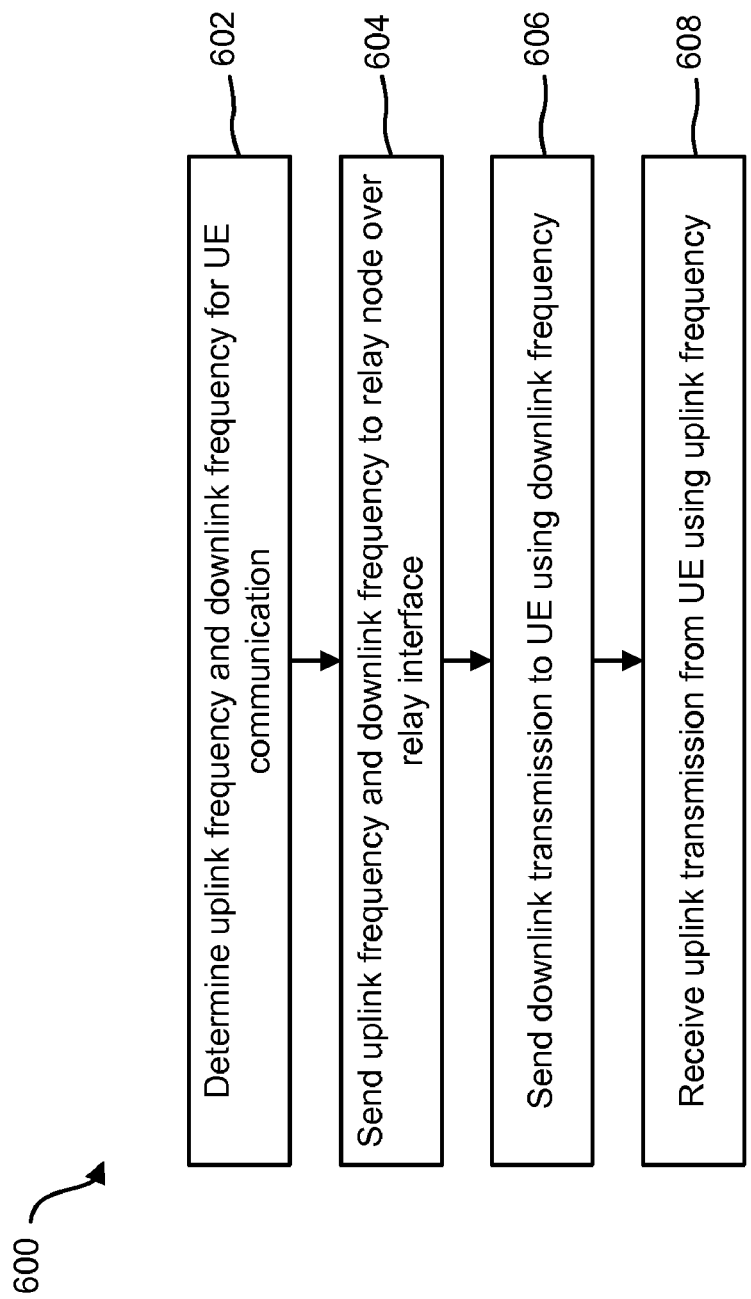
FIG. 6 is a flow diagram illustrating a method for IRIC using frequency resource allocations.

FIG. 6 is a flow diagram illustrating a method 600 for IRIC using frequency resource allocations. A relay node 506 may determine 602 the uplink frequency and downlink frequency that the relay node 506 will use for communication with a UE 504. The uplink frequency and the downlink frequency may be the same frequency. Alternatively, the uplink frequency may be different from the downlink frequency. The relay node 506 may determine 602 the uplink frequency and downlink frequency based on UE communication settings received from nearby relay nodes 506 over a relay interface 530. Alternatively, the relay node 506 may determine 602 the uplink frequency and downlink frequency based on observed channel characteristics.

The relay node 506 may then send 604 the chosen uplink frequency and downlink frequency to one or more nearby relay nodes 506 over the relay interface 530. The relay node 506 may send 604 the uplink frequency and downlink frequency as part of sending UE communication settings. The relay node 506 may send 606 a downlink transmission to a UE 504 using the downlink frequency. The relay node 506 may also receive 608 an uplink transmission from a UE 504 using the uplink frequency.

Figure 7:
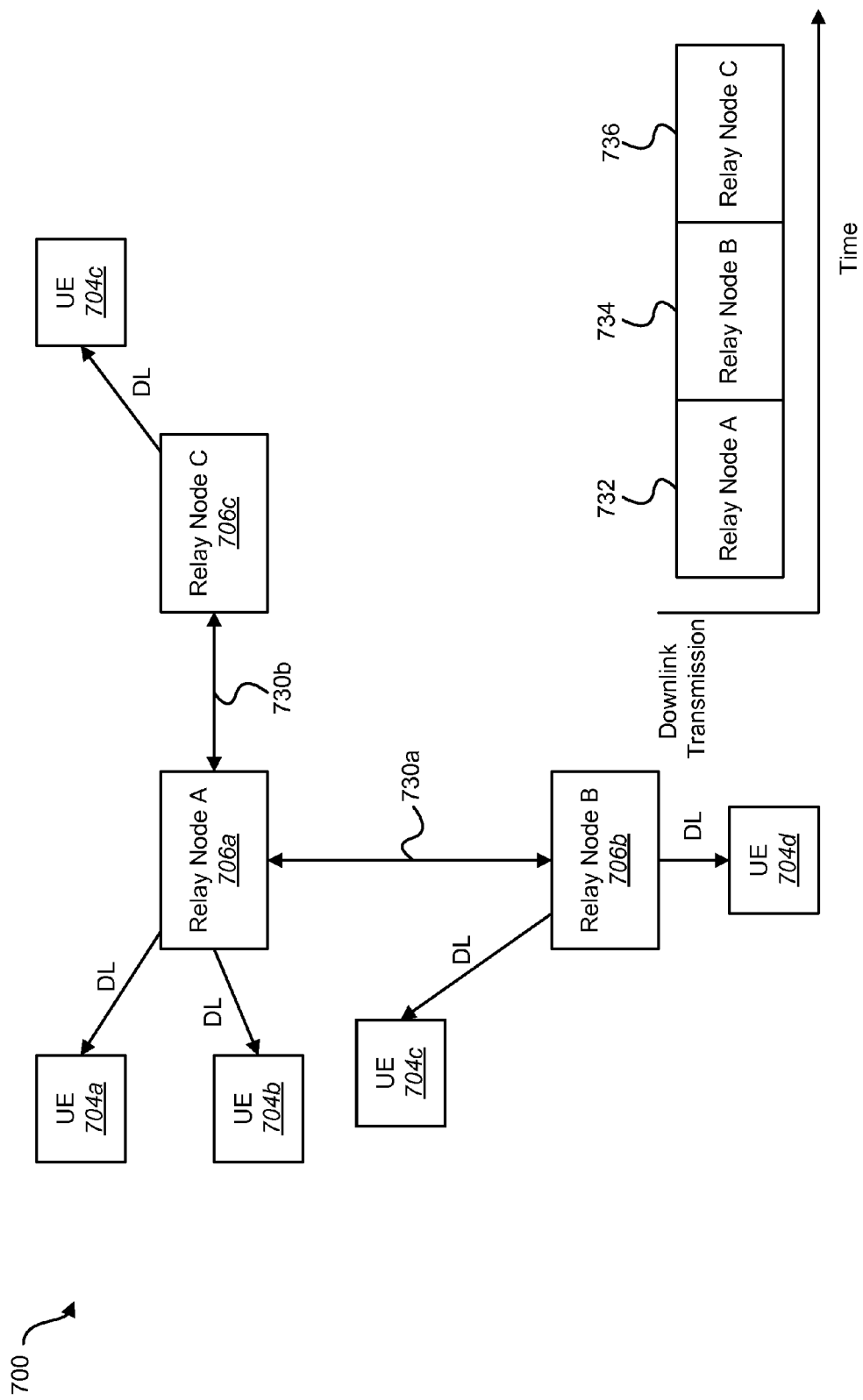
FIG. 7 is a block diagram illustrating a wireless communication system implementing time resource allocation.

FIG. 7 is a block diagram illustrating a wireless communication system 700 implementing time resource allocation. Two or more relay nodes 706 may communicate with each other using a relay interface 730. The relay nodes 706 may schedule time slots to be used for downlink transmissions over the relay interface 730 so that only the relay nodes 706 that are outside the interference range of each other transmit to UEs 704 concurrently. For example, relay node A 706a may schedule a first time slot 732 for downlink transmission, relay node B 706b may schedule a second time slot 734 for downlink transmission, and relay node C 706c may schedule a third time slot 736 for downlink transmission. Similar scheduling may be employed for the uplink.

Relay node B 706b and relay node C 706c may remain silent while relay node A 706a transmits during the first time slot 732. Relay node A 706a and relay node C 706c may remain silent while relay node B 706b transmits during the second time slot 734. Relay node A 706a and relay node B 706b may remain silent while relay node C 706c transmits during the third time slot 736.

Figure 8:
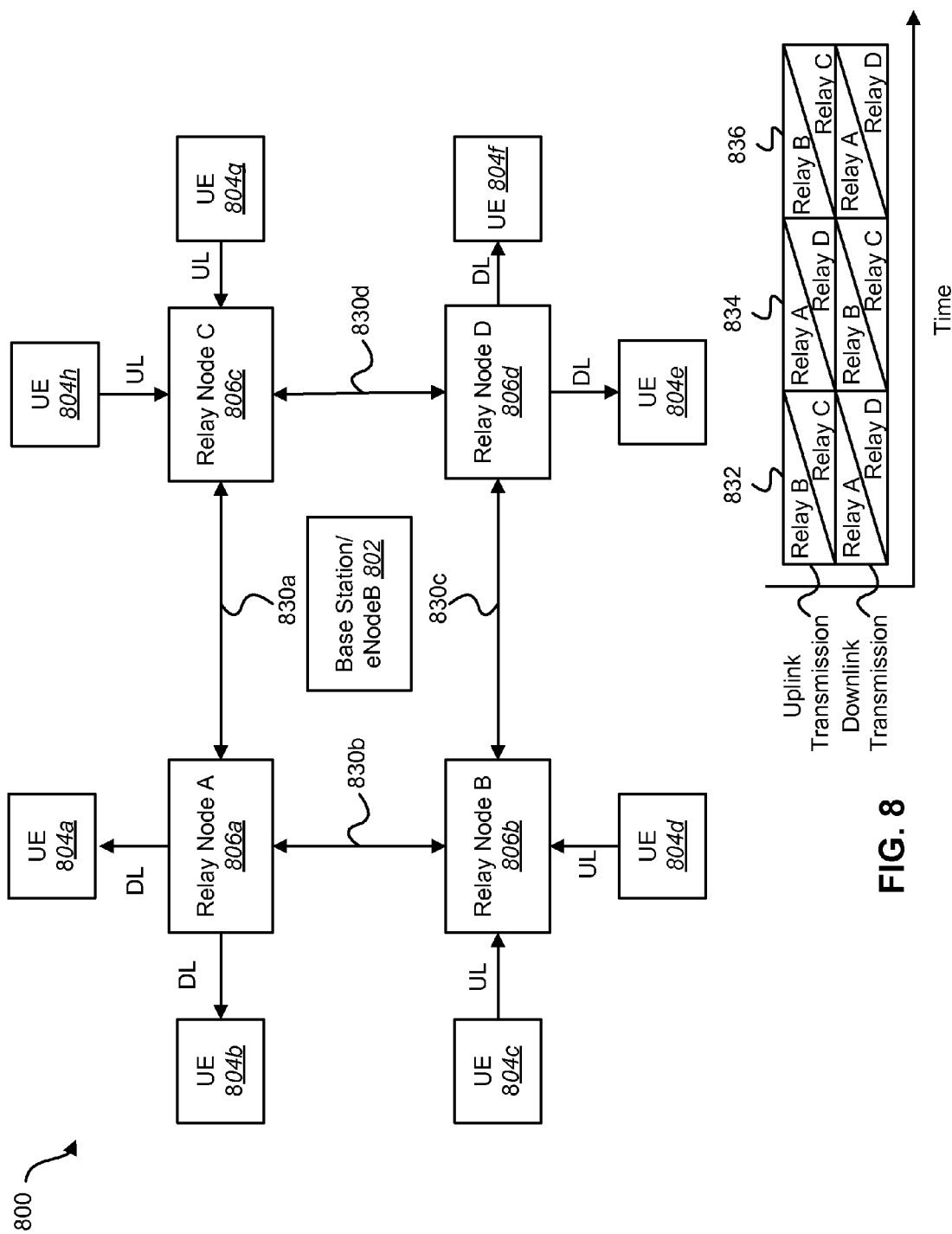
FIG. 8 is a block diagram illustrating a wireless communication system implementing advanced time resource allocation.

FIG. 8 is a block diagram illustrating a wireless communication system 800 implementing advanced time resource allocation. In FIG. 8, four relay nodes 806 are shown surrounding a base station/eNodeB 802. A relay node 806 may communicate with nearby relay nodes 806 on a relay interface 830. A relay node 806 may not communicate with relay nodes 806 that are significantly far enough away to make interference unlikely. Thus, relay node A 806a may communicate with relay node B 806b and relay node C 806c over the relay interface 830 but relay node A 806a may refrain from communicating with relay node D 806d because inter relay interference between relay node A 806a and relay node D 806d is unlikely to occur.

A relay node 806 may be in electronic communication with one or more UEs 804. A relay node 806 may schedule the time slots to be used for uplink and downlink transmissions with the UEs 804. The relay node 806 may schedule the time slots using the relay interface 830. For example, relay node A 806a may schedule a downlink transmission with one or more UEs 804 for a first time slot 832. Because relay node A 806a and relay node D 806d will not suffer from inter relay interference, relay node D 806d may also schedule a downlink transmission for the first time slot 832. Although relay node A 806a and relay node B 806b may suffer from inter relay interference, such interference may be avoided by relay node B 806b scheduling an uplink transmission during the first time slot 832. Relay node C 806c may also schedule an uplink transmission during the first time slot 832 to avoid inter relay interference with relay node D 806d. Relay node C 806c may schedule uplink transmissions that are concurrent with relay node B 806b because relay node C 806c and relay node B 806b do not suffer from inter relay interference due to each other.

Relay node A 806a may also schedule an uplink transmission with one or more UEs 804 for a second time slot 834. Likewise, relay node D 806d may also schedule an uplink transmission with one or more UEs 804 in the second time slot 834. Relay node B 806b and relay node C 806c may schedule downlink transmissions in the second time slot 834. The relay nodes 806 may schedule additional time slots such as a third time slot 836.

Figure 9:
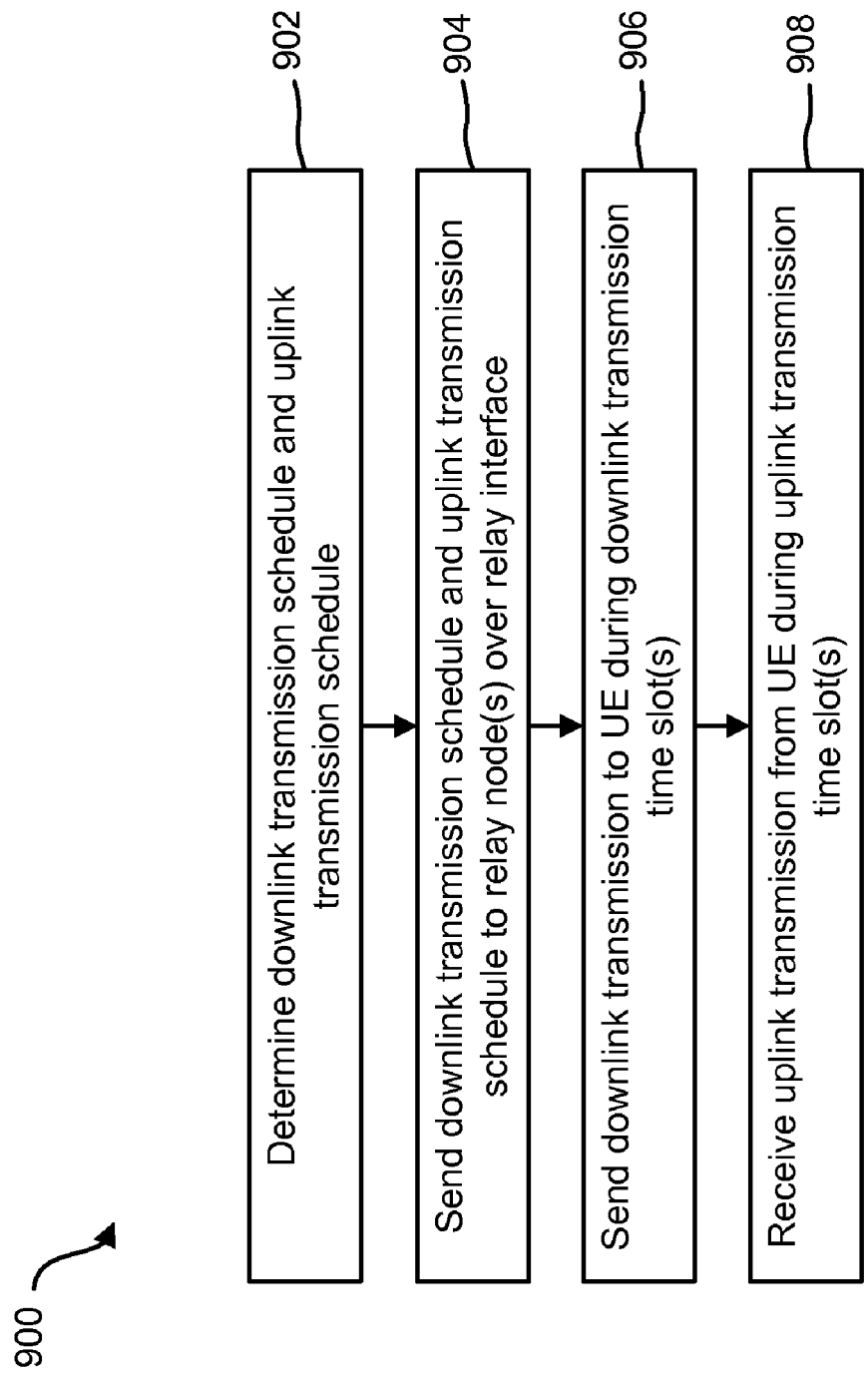
FIG. 9 is a flow diagram illustrating a method for IRIC using time resource allocation.

FIG. 9 is a flow diagram illustrating a method 900 for IRIC using time resource allocation. A relay node 806 may determine 902 a downlink transmission schedule and an uplink transmission schedule. The downlink transmission schedule and the uplink transmission schedule may be chosen based on received UE communication settings from nearby relay nodes 806 over a relay interface. The relay node 806 may send 904 the downlink transmission schedule and the uplink transmission schedule to one or more relay nodes 806 over a relay interface 830. The relay node 806 may then send 906 downlink transmissions to one or more UEs 804 during the scheduled downlink transmission time slots. The relay node 806 may also receive 908 uplink transmissions from one or more UEs 804 during the scheduled uplink transmission time slots.

Figure 10:
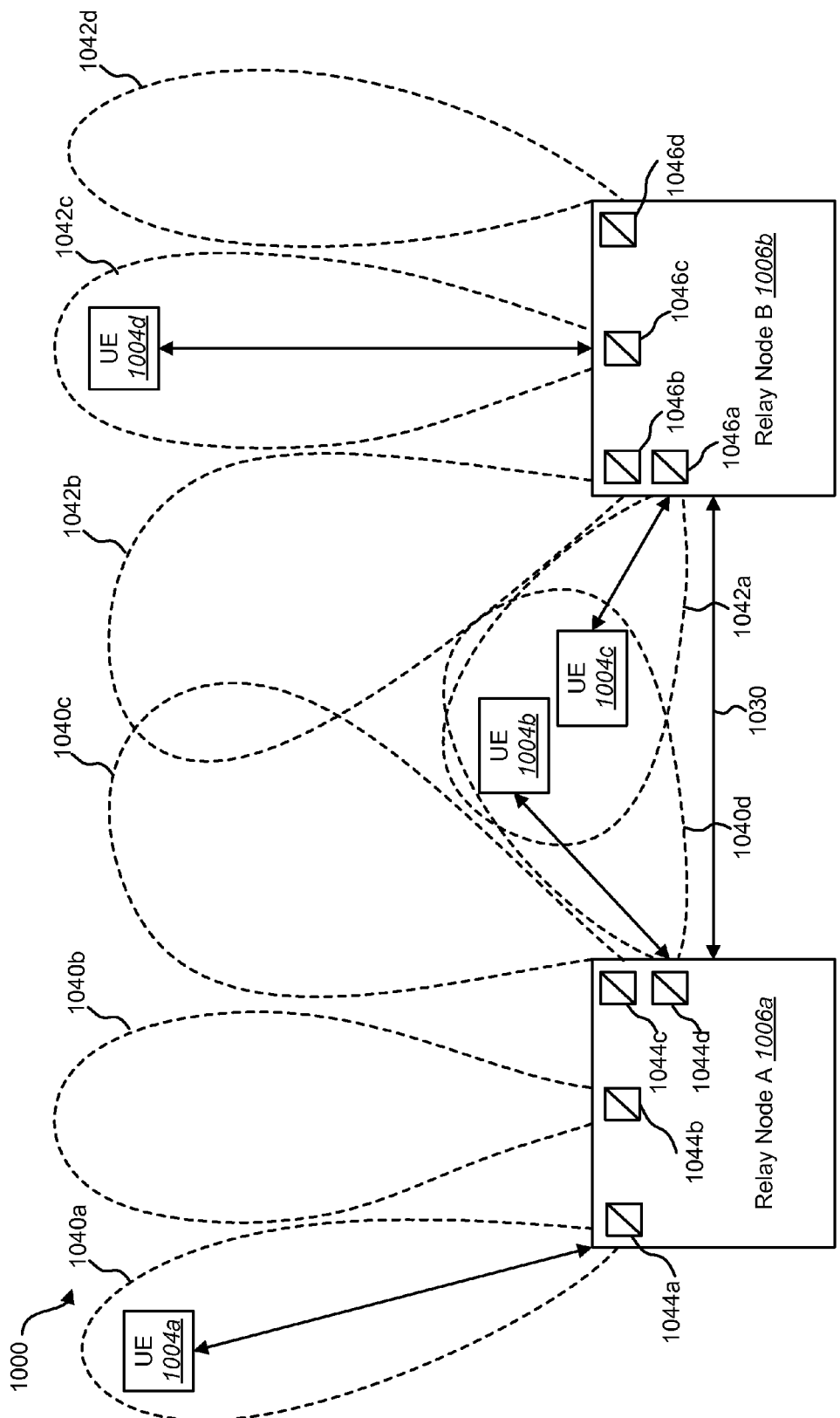
FIG. 10 is a block diagram illustrating a wireless communication system implementing space resource allocation.

FIG. 10 is a block diagram illustrating a wireless communication system 1000 implementing space resource allocation. The wireless communication system 1000 may have two or more relay nodes 1006. The relay nodes 1006 may be in electronic communication with each other via a relay interface 1030. The relay nodes 1006 may also each be in electronic wireless communication with one or more UEs 1004. Each relay node 1006 may have multiple directional antennas 1044, 1046 that allow the relay node 1006 to send wireless transmissions to a specific geographic area 1040, 1042. A relay node 1006 may have on/off switches for each of the directional antennas 1044, 1046 that allow the relay node 1006 to control the direction and timing of transmissions. The relay nodes 1006 may exchange beamforming vectors over the relay interface 1030 to organize the schedule and/or direction of the directional antennas 1044, 1046, thus reducing or eliminating inter relay interference.

For example, relay node A 1006a may be in wireless electronic communication with a first UE 1004a and a second UE 1004b. The first UE 1004a may be within the geographic area 1040a that is covered by one of the directional antennas 1044a on relay node A 1006a. The second UE 1004b may be within the geographic area 1040d that is covered by a different directional antenna 1044d on relay node A 1006a. Likewise, relay node B 1006b may be in wireless electronic communication with a third UE 1004c and a fourth UE 1004d. The third UE 1004c may be within the geographic area 1042a covered by one of the directional antennas 1046a on relay node B 1006b. The fourth UE 1004d may be within the geographic area 1042c that is covered by a different directional antenna 1046c on relay node B 1006b. Because of the proximity of geographic area 1040d and geographic area 1042a, communications between relay node A 1006a and the second UE 1004b may interfere with communications between relay node B 1006b and the third UE 1004c. This inter relay interference may be avoided by coordinating the beams from the directional antennas 1044, 1046 of each relay node 1006.

Figure 11:
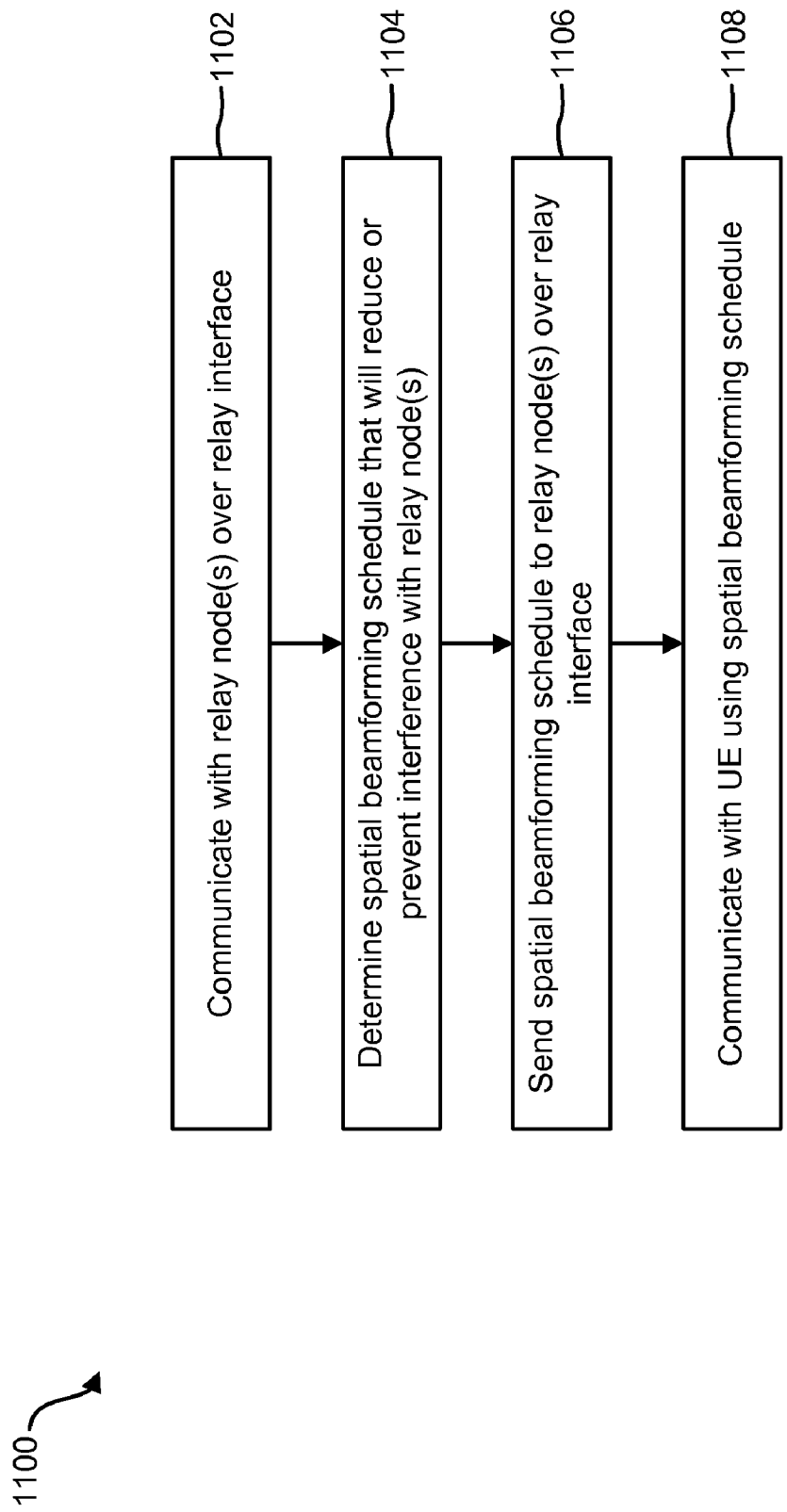
FIG. 11 is a flow diagram illustrating a method for IRIC using space resource allocation.

FIG. 11 is a flow diagram illustrating a method 1100 for IRIC using space resource allocation. A relay node 1006 may communicate 1102 with one or more relay nodes 1006 over a relay interface 1030. The relay node 1006 may determine 1104 a spatial beamforming schedule that will reduce or prevent interference with the other relay nodes 1006. The relay node 1006 may then send 1106 the spatial beamforming schedule to the other relay nodes 1006 over the relay interface 1030. The relay node 1006 may then communicate 1108 with one or more UEs 1004 using the spatial beamforming schedule.

Figure 12:
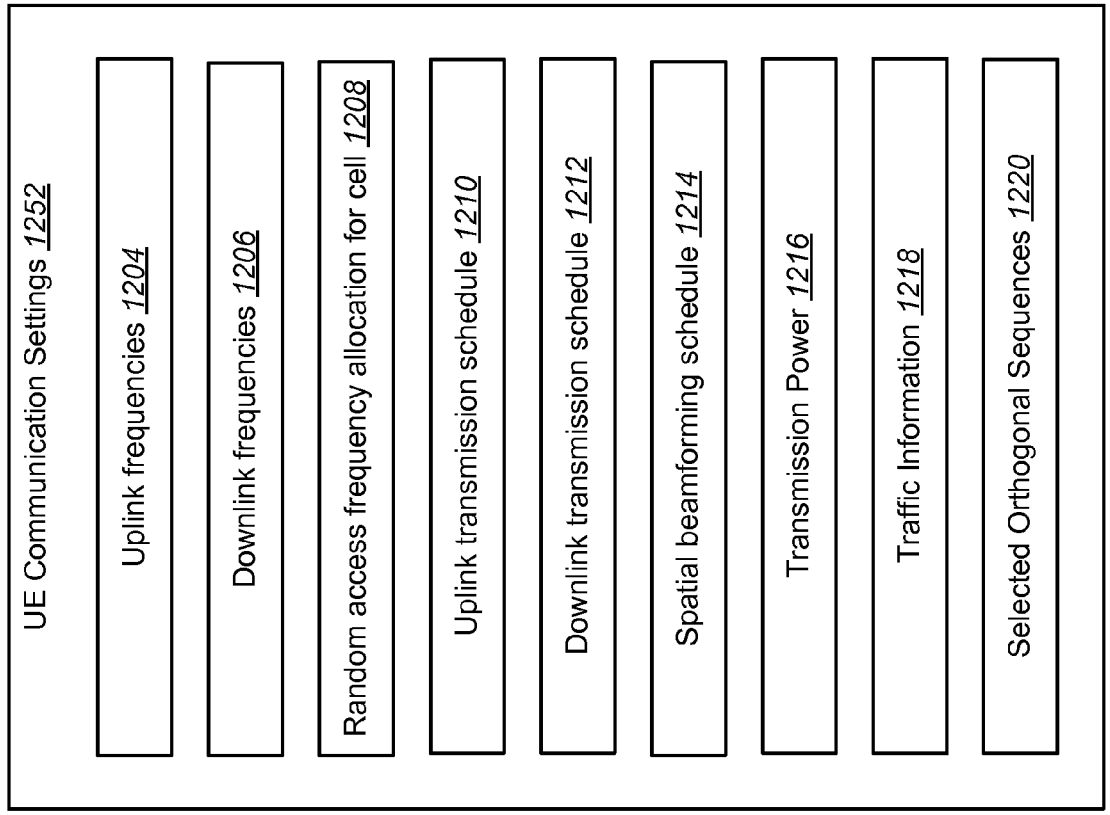
FIG. 12 is a block diagram illustrating the settings that may be included in UE communication settings.

FIG. 12 is a block diagram 1200 illustrating the settings that may be included in UE communication settings 1252. UE communication settings 1252 may include uplink frequencies 1204 used, downlink frequencies 1206 used, and random access frequency allocations for a cell 1208. UE communication settings 1252 may also include an uplink transmission schedule 1210, a downlink transmission schedule 1212, and a spatial beamforming schedule 1214.

UE communication settings 1252 may further include the transmission power 1216. A relay node 106 may use different transmission power 1216 levels depending on the distance between the relay node 106 and a UE 104. A relay node 106 may adjust the transmission power 1216 based on the distance between the relay node 106 and a UE 104, the distance between the relay node 106 and other relay nodes 106, and the distance between the relay node 106 and a base station 102.

UE communication settings 1252 may also include traffic information 1218. Each relay node 106 may use a bandwidth proportional to the traffic that the relay node 106 needs to send. The traffic information 1218 may include the amount of traffic that a relay node 106 needs to send and the bandwidth that the relay node 106 intends to use. Alternatively, the relay nodes 106 may randomly choose bandwidths, such that the probability of a relay node 106 interfering with the entire frequency allocation of an adjacent relay node 106 is very small. Other relay nodes 106 may estimate the probability of a collision using the received traffic information 1218. If a collision probability is too high, a relay node 106 may defer a transmission. For example, if there are 100 resource blocks (RB) or sub carriers allocated to the relay nodes 106 and each relay node 106 needs 1 RB to communicate with each UE 104, then the probability of both relay nodes 106 using the same RB is 1/100 or 0.01.

UE communication settings 1252 may also include selected orthogonal sequences 1220. A relay node 106 and a UE 104 may use a unique orthogonal sequence that does not interfere with nearby relay nodes 106 and UEs 104. Other relay nodes 106 may receive the selected orthogonal sequences 1220 from a relay node 106 over the relay interface 130 and the other relay nodes 106 may select an orthogonal sequence that is not being used by the nearby relay node 106.

Figure 13:
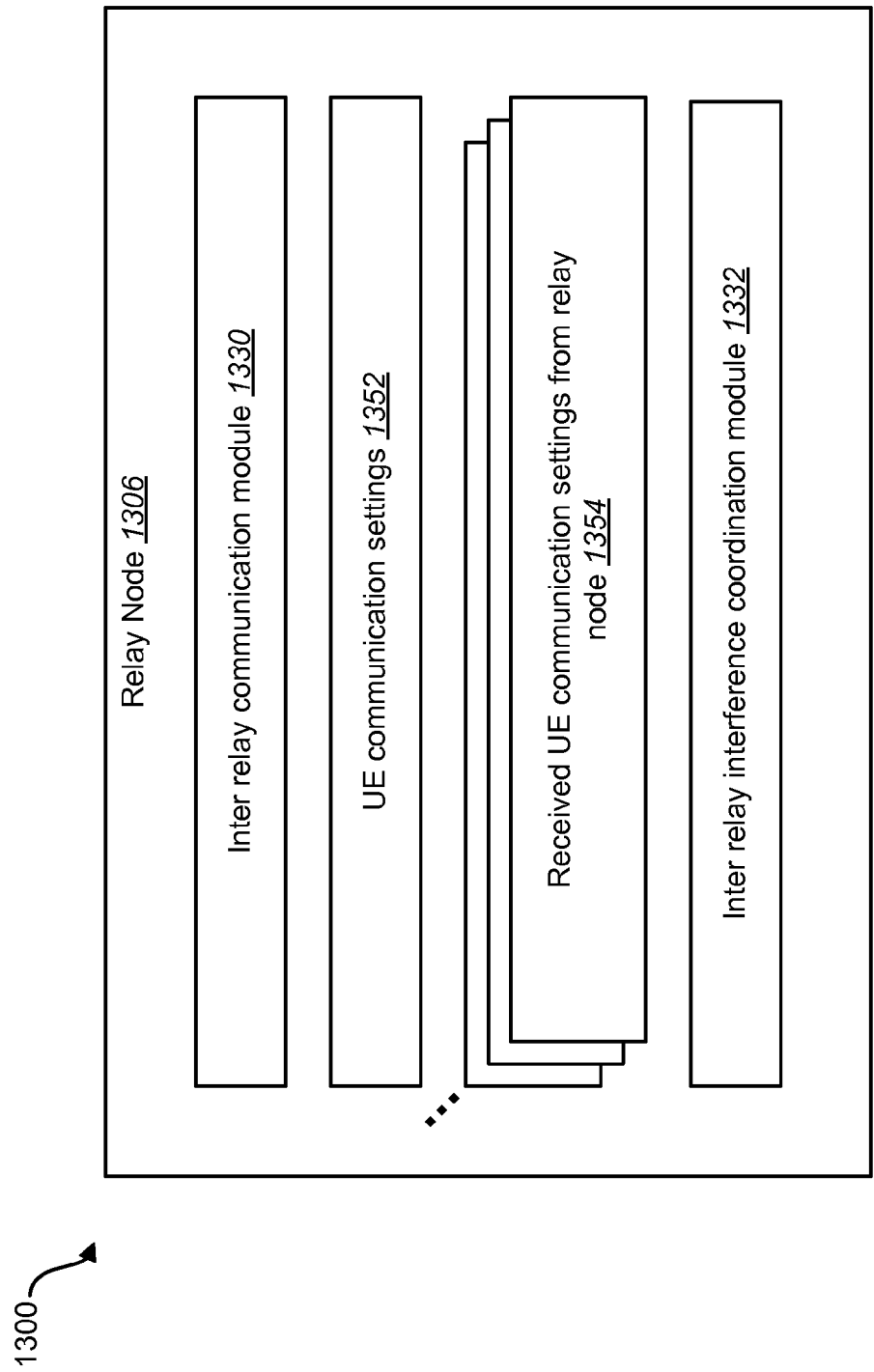
FIG. 13 is a block diagram of a relay node that may be used in the present systems and methods.

FIG. 13 is a block diagram of a relay node 1306 that may be used in the present systems and methods. A relay node 1306 may be used in a communication system to reduce the error rate, to increase the coverage area, or to improve the throughput. A relay node 1306 may not have unique information. Instead, a relay node 1306 may simply retransmit received signal transmissions.

Multiple types or levels of relay nodes 1306 may be available. A layer 1 relay node 1306 may amplify and retransmit a received analog signal without any processing. A layer 1 relay node 1306 may also be referred to as a repeater or a relay with an amplify-and-forward scheme and may have only one physical layer. A layer 2 relay node 1306 may decode a received signal, re-encode the received signal, and retransmit the received signal. A layer 2 relay node 1306 may also be referred to as a regenerative relay or a relay with decode-and-forward functionality. A layer 2 relay node 1306 may have both a physical layer and a link layer. A layer 3 relay node 1306 may be an intermediate base station 102 with the full functionality of a base station 102 to a proper subset of UEs 104 within the relay node's 1306 vicinity. A layer 3 relay node 1306 may also have additional functionality such as self-backhauling to the eNodeB. A home eNodeB may also be used as a relay node 1306. The present systems and methods may operate independent of the type of relay node 1306.

A relay node 1306 may include an inter relay communication module 1330. The inter relay communication module 1330 may allow the relay node 1306 to communicate with other relay nodes 106 over the relay interface 130. A relay node 1306 may also include UE communication settings 1352 used by the relay node 1306. A relay node 1306 may send the UE communication settings 1352 to other relay nodes 106 over the relay interface 130 using the inter relay communication module 1330.

A relay node 1306 may also include one or more received UE communication settings 1354 from one or more relay nodes 106. A relay node 1306 may also include an inter relay interference coordination module 1332. The inter relay interference coordination module 1332 may include algorithms for determining which IRIC method(s) to use and the settings to use for the selected IRIC methods.

Figure 14:
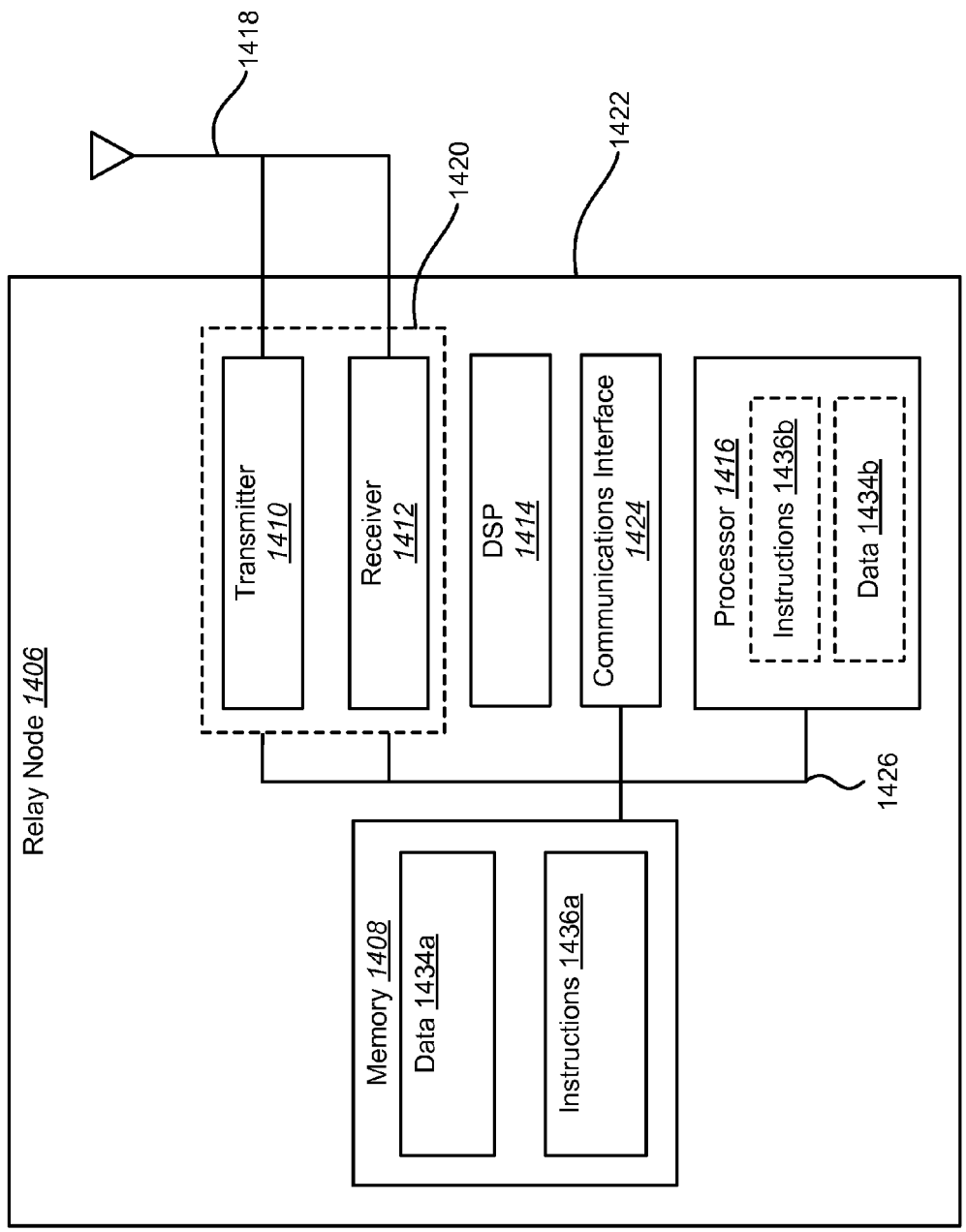
FIG. 14 is a block diagram of a relay node in accordance with one configuration of the described systems and methods.

FIG. 14 is a block diagram of a relay node 1406 in accordance with one configuration of the described systems and methods. The relay node 1406 may be a repeater, a regenerative relay, an intermediate relay node, etc. The relay node 1406 may include a transceiver 1420 that includes a transmitter 1410 and a receiver 1412. The transceiver 1420 may be coupled to one or more antennas 1418. The relay node 1406 may further include a digital signal processor (DSP) 1414, a general purpose processor 1416, memory 1408, and a communications interface 1424. The various components of the relay node 1406 may be included within a housing 1422.

The processor 1416 may control operation of the relay node 1406. The processor 1416 may also be referred to as a CPU. The memory 1408, which may include both read-only memory (ROM) and random access memory (RAM), provides instructions 1436a and data 1434a to the processor 1416. A portion of the memory 1408 may also include non-volatile random access memory (NVRAM). The memory 1408 may include any electronic component capable of storing electronic information, and may be embodied as ROM, RAM, magnetic disk storage media, optical storage media, flash memory, on-board memory included with the processor 1416, EPROM memory, EEPROM memory, registers, a hard disk, a removable disk, a CD-ROM, etc.

The memory 1408 may store program instructions 1436a and other types of data 1434a. The program instructions 1436a may be executed by the processor 1416 to implement some or all of the methods disclosed herein. The processor 1416 may also use the data 1434a stored in the memory 1408 to implement some or all of the methods disclosed herein. As a result, instructions 1436b and data 1434b may be loaded and/or otherwise used by the processor 1416.

In accordance with the disclosed systems and methods, the antenna 1418 may receive reverse link signals that have been transmitted from a nearby communications device, such as a UE 104 and forward link signals that have been transmitted from a nearby base station 102. The antenna 1418 provides these received signals to the transceiver 1420 which filters and amplifies the signals. The signals are provided from the transceiver 1420 to the DSP 1414 and to the general purpose processor 1416 for demodulation, decoding, further filtering, etc.

The various components of the relay node 1406 are coupled together by a bus system 1426 which may include a power bus, a control signal bus, and a status signal bus in addition to a data bus. However, for the sake of clarity, the various busses are illustrated in FIG. 14 as the bus system 1426.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inter relay interference coordination (IRIC) by a first relay node in a wireless communications system, the method comprising:
   communicating with a second relay node over a relay interface;
   receiving a first set of user equipment (UE) communication settings over the relay interface that correspond to the second relay node; and
   determining a second set of UE communication settings that correspond to the first relay node, wherein the second set of UE communication settings are based on the first set of UE communication settings, wherein the first set of UE communication settings includes a first transmission schedule and the second set of UE communication settings includes a second transmission schedule, wherein the first transmission schedule and the second transmission schedule include scheduled transmission time slots, and wherein the first transmission schedule includes scheduled uplink transmission time slots that are not concurrent with scheduled uplink transmission time slots of the second transmission schedule.

2. The method of claim 1, further comprising sending the second set of UE communication settings to the second relay node over the relay interface.

3. The method of claim 1, further comprising sending the second set of UE communication settings to a third relay node over the relay interface.

4. The method of claim 1, further comprising communicating with a UE using the first set of UE communication settings.

5. The method of claim 1, wherein the first set of UE communication settings include using a first communication frequency and the second set of UE communication settings include using a second communication frequency, wherein the second communication frequency is selected to reduce or prevent interference between the first relay node and the second relay node.

6. A method for inter relay interference coordination (IRIC) by a first relay node in a wireless communications system, the method comprising:
   communicating with a second relay node over a relay interface;
   receiving a first set of user equipment (UE) communication settings over the relay interface that correspond to the second relay node; and
   determining a second set of UE communication settings that correspond to the first relay node, wherein the second set of UE communication settings are based on the first set of UE communication settings, wherein the first set of UE communication settings include using a first communication frequency and the second set of UE communication settings include using a second communication frequency, wherein the second communication frequency is selected to reduce or prevent interference between the first relay node and the second relay node, and wherein the second communication frequency is selected to be mutually orthogonal with the first communication frequency to reduce or prevent interference between the first relay node and the second relay node.

7. A method for inter relay interference coordination (IRIC) by a first relay node in a wireless communications system, the method comprising:

communicating with a second relay node over a relay interface;
receiving a first set of user equipment (UE) communication settings over the relay interface that correspond to the second relay node; and
determining a second set of UE communication settings that correspond to the first relay node, wherein the second set of UE communication settings are based on the first set of UE communication settings, wherein the first set of UE communication settings includes a first spatial beamforming schedule and the second set of UE communication settings includes a second spatial beamforming schedule.

8. The method of claim 7, wherein the second spatial beamforming schedule is set to reduce or prevent interference with the second relay node.

9. A relay node for selective transmission in a wireless communications system, the relay node comprising:
a processor;
memory in electronic communication with the processor;
instructions stored in the memory, the instructions being executable to:
communicate with a second relay node over a relay interface;
receive a first set of user equipment (UE) communication settings over the relay interface that correspond to the second relay node; and
determine a second set of UE communication settings that correspond to the first relay node, wherein the second set of UE communication settings are based on the first set of UE communication settings, wherein the first set of UE communication settings includes a first transmission schedule and the second set of UE communication settings includes a second transmission schedule, wherein the first transmission schedule and the second transmission schedule include scheduled transmission time slots, and wherein the first transmission schedule includes scheduled uplink transmission time slots that are not concurrent with scheduled uplink transmission time slots of the second transmission schedule.

10. The relay node of claim 9, wherein the instructions are further executable to send the second set of UE communication settings to the second relay node over the relay interface.

11. The relay node of claim 9, wherein the instructions are further executable to send the second set of UE communication settings to a third relay node over the relay interface.

12. The relay node of claim 9, wherein the instructions are further executable to communicate with a UE using the first set of UE communication settings.

13. The relay node of claim 9, wherein the first set of UE communication settings include using a first communication frequency and the second set of UE communication settings include using a second communication frequency, wherein the second communication frequency is selected to reduce or prevent interference between the first relay node and the second relay node.

14. A relay node for selective transmission in a wireless communications system, the relay node comprising:
a processor;
memory in electronic communication with the processor;
instructions stored in the memory, the instructions being executable to:
communicate with a second relay node over a relay interface;
receive a first set of user equipment (UE) communication settings over the relay interface that correspond to the second relay node; and
determine a second set of UE communication settings that correspond to the first relay node, wherein the second set of UE communication settings are based on the first set of UE communication settings, wherein the first set of UE communication settings include using a first communication frequency and the second set of UE communication settings include using a second communication frequency, wherein the second communication frequency is selected to reduce or prevent interference between the first relay node and the second relay node, and wherein the second communication frequency is selected to be mutually orthogonal with the first communication frequency to reduce or prevent interference between the first relay node and the second relay node.

15. A relay node for selective transmission in a wireless communications system, the relay node comprising:
a processor;
memory in electronic communication with the processor;
instructions stored in the memory, the instructions being executable to:
communicate with a second relay node over a relay interface;
receive a first set of user equipment (UE) communication settings over the relay interface that correspond to the second relay node; and
determine a second set of UE communication settings that correspond to the first relay node, wherein the second set of UE communication settings are based on the first set of UE communication settings, and wherein the first set of UE communication settings includes a first spatial beamforming schedule and the second set of UE communication settings includes a second spatial beamforming schedule.

16. The relay node of claim 15, wherein the second spatial beamforming schedule is set to reduce or prevent interference with the second relay node.

17. A non-transitory computer-readable medium for inter relay interference coordination (IRIC) by a first relay node, comprising executable instructions for:
communicating with a second relay node over a relay interface;
receiving a first set of user equipment (UE) communication settings over the relay interface that correspond to the second relay node; and
determining a second set of UE communication settings that correspond to the first relay node, wherein the second set of UE communication settings are based on the first set of UE communication settings, wherein the first set of UE communication settings includes a first transmission schedule and the second set of UE communication settings includes a second transmission schedule, wherein the first transmission schedule and the second transmission schedule include scheduled transmission time slots, and wherein the first transmission schedule includes scheduled uplink transmission time slots that are not concurrent with scheduled uplink transmission time slots of the second transmission schedule.

18. A wireless communication system for inter relay interference coordination (IRIC), the wireless communication system comprising:

one or more base stations for serving a plurality of user equipments (UEs); and a first relay node and a second relay node in electronic communication over a relay interface, wherein the first relay node and the second relay node coordinate communications to reduce inter relay interference, wherein the first relay node and the second relay node use orthogonal sequences to communicate with UEs to avoid interfering with each other.

19. The wireless communication system of claim 18, wherein the first relay node and the second relay node exchange traffic information to avoid interfering with each other.

20. The wireless communication system of claim 18, wherein the base stations use a portion of the bandwidth for communicating with UEs and the relay nodes use the rest of the total available bandwidth for communicating with UEs.

21. The wireless communication system of claim 20, wherein adjacent base stations reserve different portions of the bandwidth for use by the relay nodes.

22. The wireless communication system of claim 18, wherein a relay node uses a fraction of the bandwidth allocated to the relay node, wherein the fraction of the bandwidth depends on the traffic requirements of a UE in communication with the relay node.

23. A wireless communication system for inter relay interference coordination (IRIC), the wireless communication system comprising:

one or more base stations for serving a plurality of user equipments (UEs); and a first relay node and a second relay node in electronic communication over a relay interface, wherein the first relay node and the second relay node coordinate communications to reduce inter relay interference, and wherein the first relay node and the second relay node communicate concurrently on the uplink and downlink during the same time slot in order to reduce inter relay interference.

* * * * *